(12) United States Patent
Crossley et al.

(10) Patent No.: US 6,181,776 B1
(45) Date of Patent: *Jan. 30, 2001

(54) NETWORK MANAGEMENT OF AUTOMATIC CALL DISTRIBUTOR RESOURCES

(75) Inventors: Steven John Crossley, Plano; Michael Dean Rambo, Colleyville, both of TX (US)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/998,323

(22) Filed: Dec. 24, 1997

(51) Int. Cl.[7] ................................................ H04M 1/24
(52) U.S. Cl. ........................ 379/34; 379/265; 379/266; 379/309
(58) Field of Search ................................ 379/265, 266, 379/221, 34, 207, 212, 309, 230, 111, 140

(56) References Cited

U.S. PATENT DOCUMENTS

| | | | |
|---|---|---|---|
| 5,299,259 | * | 3/1994 | Otto ........................ 379/221 |
| 5,325,292 | * | 6/1994 | Crockett ........................ 705/9 |
| 5,802,146 | * | 9/1998 | Dulman ........................ 705/34 |
| 5,911,134 | * | 6/1999 | Castonguay et al. ........... 379/9 |
| 5,946,375 | * | 8/1999 | Pattison et al. ............... 379/34 |
| 5,968,124 | * | 10/1999 | Takahashi et al. ........... 709/224 |
| 6,115,393 | * | 9/2000 | Engel et al. .................. 370/469 |

* cited by examiner

Primary Examiner—Krista Zele
Assistant Examiner—Bing Bui
(74) Attorney, Agent, or Firm—Haynes and Boone, LLP (57) ABSTRACT

A method and a network are disclosed that automate monitoring of call centers for problem conditions. The problem conditions are detected based on defined parameters such that the cause of the problem condition is readily apparent from a triggered alarm condition. One method includes the steps of creating a management information base (MIB), defining a threshold for the condition to be stored in the MIB, selecting the external destination to notify, monitoring the condition by the CCMIS; and generating a trap message in response to violation of the condition.

The system includes a user interface for defining the conditions to be monitored, an SNMP MIB consisting of three tables that describes the variables that may be queried by a network management system using the SNMP protocol, and an SNMP agent which implements the variables defined by the MIB, the ACD configuration, and the alarms defined via the user interface. The user interface consists of an Alarm Definition screen within the CCMIS supervisor interface that allows alarm definitions to be defined based on any real-time statistics collected for each ACD group within the ACD. Each alarm definition consists of a formula selection to define the statistic to be monitored, threshold information to define the conditions under which an alarm is generated, and trap generation settings such as trap type and the list of ACD groups for which traps should be generated.

22 Claims, 4 Drawing Sheets

NETWORK MANAGEMENT OF AUTOMATIC CALL DISTRIBUTOR RESOURCES

MICROFICHE APPENDIX

Conforming to 37 C.F.R. 1.96(c), relevant computer codes are included herein as the Microfiche Appendix I, which has a total of 137 frames.

BACKGROUND OF THE INVENTION

This invention relates in general to a computer management system and, more particularly, to automated management of an automatic call distributor center.

Current methods of monitoring a network, such as a call center with a plurality of switches, rely upon manual or human detection of problem conditions. Each call center is capable of simultaneously receiving and handling thousands of incoming calls into the call center. Each incoming call is routed by an automatic call distributor (ACD) to a call receiving agent. The call receiving agent can be an automated agent, such as an interactive voice response unit, or a person.

Call centers vary in size, from a few agents to several thousand agents. Typically, one or more supervisor work-stations are established to monitor the status of the agents and the calls received. Each supervisor work-station employs an individual (supervisor) to monitor a real-time agent status graphical display to visually watch for specific status patterns to detect failures of their respective agents. For example, a change in status of an agent could be represented by a change in color on the graphical display. Rapid detection of any failure relies on the supervisor's constant and astute attention. The supervisor must then determine and resolve the problem condition. However, human detection is ineffective and inefficient given that each supervisor may potentially monitor several call centers, with each call center having thousands of call receiving agents. Additionally, when the operator detects that the status of the call receiving agent has changed to a problem condition, the operator can not readily determine the cause of the problem.

Therefore, what is needed is a method and a system to automate monitoring of call centers for problem conditions that are detected based on defined parameters such that the cause of the problem condition is readily apparent from a triggered alarm condition.

SUMMARY OF THE INVENTION

The foregoing problems are solved and a technical advance is achieved by a method and a network that automates monitoring of call centers for problem conditions. The problem conditions are detected based on defined parameters such that the cause of the problem condition is readily apparent from a triggered alarm condition. To this end, the method includes the steps of creating a management information base (MIB), defining a threshold for the condition to be stored in the MIB, selecting the external destination to notify, monitoring the condition for violations of the threshold, and generating a trap message in response to violation of the condition.

An advantage of the present invention is that it allows an operator to define alarm conditions using an interface, which automates the detection of problem conditions. Accordingly, problem conditions are detected based on parameters established by the defined alarm conditions. The alarm conditions are established in accordance with a simple network management protocol (SNMP) to allow for querying of a management agent supported by a MIB. The MIB can be queried by a network management system (NMS) using the SNMP interface and the agent implements the variables defined by the MIB, the automatic call distributor (ACD) configuration, and the alarms defined via the interface.

Another advantage of the present invention is that a Call Center Management Information System (CCMIS) supervisor has a user interface with an alarm definition screen that allows alarm parameters to be established for the CCMIS. Furthermore, the alarm parameters can be based on any real time statistics collected for each ACD group.

DETAIL DESCRIPTION OF THE INVENTION

For better describing embodiments of the present invention, Appendix A, B, and C referred to hereafter are included herein as a Microfiche Appendix.

Figure 1:
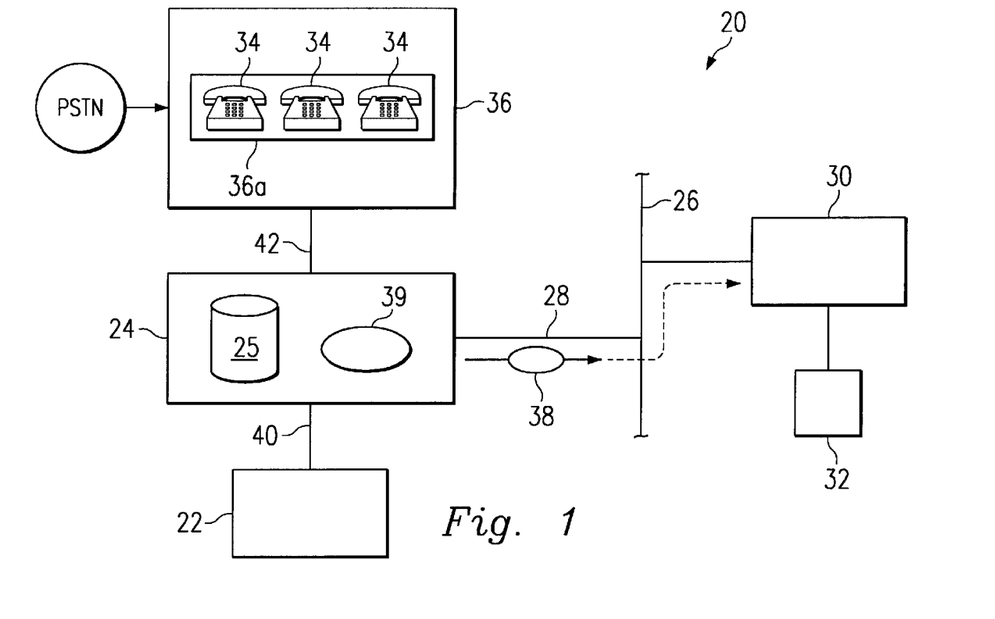
FIG. 1 shows a network management system coupled to a call center management information system (CCMIS) for automated monitoring of an automatic call distributor (ACD) center.

FIG. 1 shows a network 20 having a terminal 22, a call center management information system (CCMIS) 24, a management information base (MIB) 25, a local area network (LAN) connection 26, a simple network management protocol (SNMP) interface 28, a network management system (NMS) 30, a graphic workstation 32, a plurality of agents 34, and an automatic call distributor (ACD) switch 36.

The SNMP interface 28 and the MIB 25

SNMP is a standard internetwork protocol (IP) that allows an NMS to gather status information from devices in a network, such as the network 20. These devices typically include hubs, routers, and bridges. The definition of the data made available to the NMS by the devices is stored in an MIB, such as the MIB 25.

In the present embodiment, the MIB 25 defines a set of items that management applications and agents use to report and control managed devices. The MIB 25 includes a name for identifying the particular MIB. The name of the MIB 25 is followed by an import statement which allows an MIB writer to specify information from other MIBs that are referred to in the MIB 25. The MIB 25 also includes a structure defining a group or groups for organizing related pieces of information.

A group may contain information in the form of items (objects), subgroups, or a combination of the two. Similarly, each sub-group is configured like a group. Within a group or sub-group, data is organized as a scaler item or a table. A scalar item is a single piece of information, for example, the total memory in a server. A table is a structure for organizing several pieces of information, or elements, to uniquely identify a single data item within a group of similar items. A table includes a SEQUENCE operator, which provides a definition for a table type from a group of several standard types. A table also includes a SEQUENCE-OF operator, which defines a list having the same type of elements. A table also includes an INDEX clause, which specifies the items that can be used to uniquely identify an element in the table. An example of an item that can be organized in a table is an EISA board ID.

Each item defined in the MIB 25 includes a description having a SYNTAX, ACCESS, STATUS and DESCRIPTION clause. The SYNTAX clause specifies the type of information which the item contains, such as "integer," "octet string," "counter" or "ASCII." The ACCESS clause specifies how the item may be used and shows the actions which the agent may support for the item, such as "read-only," "read-write" or "not-accessible." "Not-accessible" specifies the access for organizational constructs that do not represent data items and is used only for table features and should not be used for a scaler item. The STATUS clause specifies whether the item is required for an agent that supports the defined group, such as "mandatory", which means that the item will always be present if the defined group is supported by the agent, or "optional," which means that a particular implementation has the option of supporting the item. The DESCRIPTION clause contains a delimited text description of the item. The item definition ends by specifying how the item fits into the MIB 25, such as the group to which the item belongs and a unique branch number within the group for the item.

The MIB 25 also contains trap definitions. A trap is a notification sent by the SNMP agent 39 to the workstation 32. The trap is sent to inform a supervisor at the workstation 32 about an event that has occurred. A trap definition begins with a name of the trap, followed by a term TRAP-TYPE. An ENTERPRISE clause, an optional VARIABLES clause, a DESCRIPTION clause, and a number are then provided by the trap. Typically, the additional information contained in the ENTERPRISE and VARIABLES clauses will be items defined in the MIB 25 to identify the trap. The DESCRIPTION clause explains the significance of the trap and the conditions that would cause it to be sent. The number is unique within the scope of the ENTERPRISE. Both the enterprise name and the trap number are used by the management station to uniquely determine the identity of a received trap.

Figure 2:
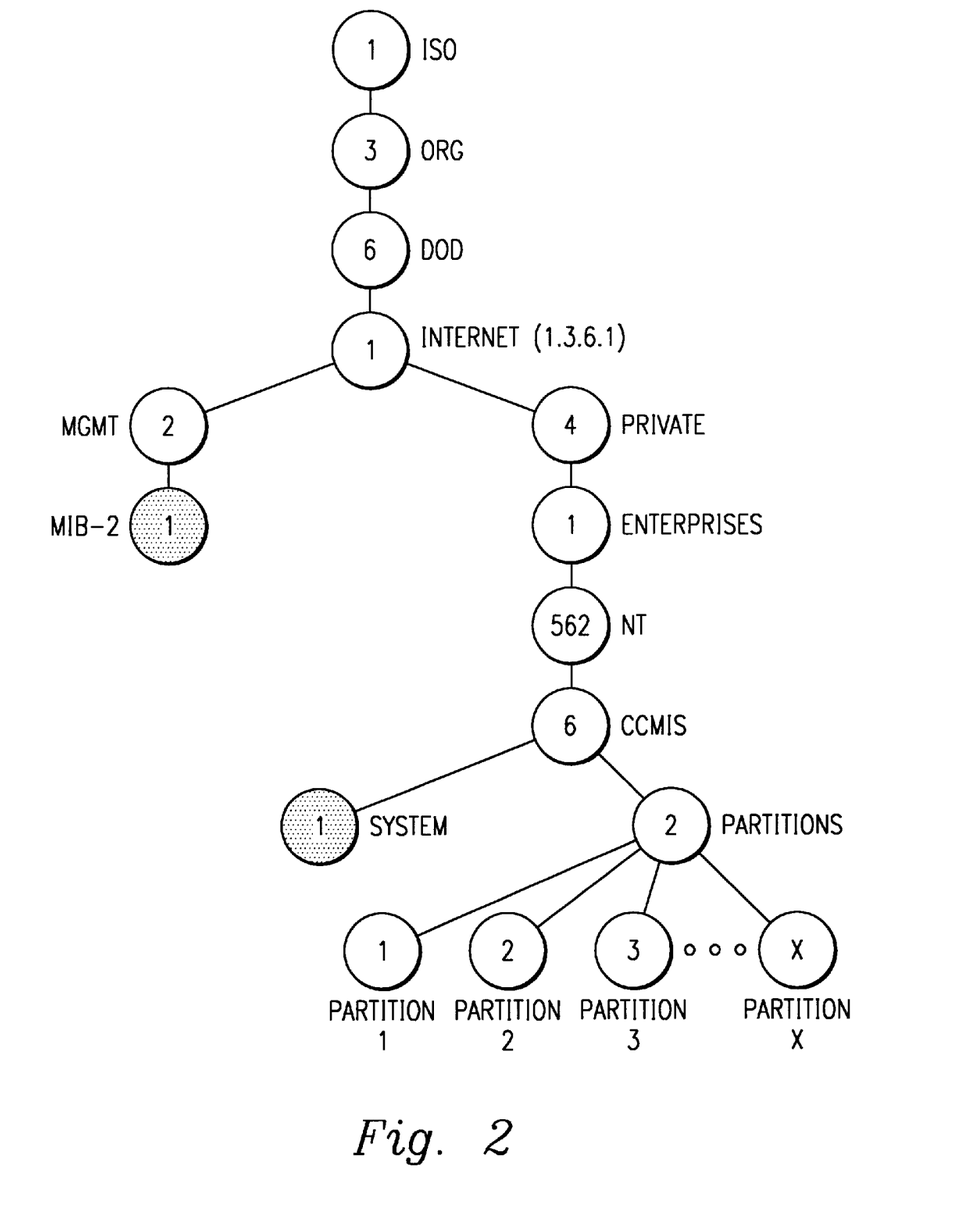
FIG. 2 is an internetwork tree showing system and partition nodes.

Referring now to FIG. 2, the MIB 25 is a custom MIB for the CCMIS 24 that describes the variables supported by the SNMP agent 39. In order to define a custom MIB and "hang" it in an SNMP object hierarchy, a branch must be made for the MIB in the "private.enterprises" subtree. For example, Northern Telecom, Inc. (nt) currently has an official branch number of "562" in this subtree that was assigned by the Internet Assigned Numbers Authority (IANA). Accordingly, all nt SNMP-manageable products are assigned branch numbers under the branch number "562". Under the "562" branch, the CCMIS is assigned branch number 6. Thus, in this example, the starting point for all custom CCMIS MIBs is as follows:

iso.org.dod.internet.private.enterprises.nt.ccmis which, expressed numerically, is:

1.3.6.1.4.1.562.6

By defining the MIB 25, the SNMP interface 28 can be added to the CCMIS 24. Using the SNMP interface, the CCMIS 24 supports a standard MIB-2 as well as two custom MIB definitions for management of the CCMIS 24 entity running on this platform. The MIB-2 includes information regarding the host system and its network interfaces. Requests for MIB-2 variables are passed off by the CCMIS agent to a standard agent for processing. The NMS 30 queries and retrieves information from the MIB-2 and/or the custom CCMIS MIBs. Based on the retrieved information, the NMS 30 determines the status of the ACD group 36a.

There are two different classes of CCMIS users with potentially different realms of control, a CCMIS service provider and a call center operator. The CCMIS service provider is responsible for maintaining and configuring the physical CCMIS hardware platform and the associated software. The call center operators use CCMIS capabilities and services to manage their ACD call centers. Because of these two classes of users, there is a need to provide a clear delineation between what the service provider and call center operator can access. For this reason two different MIB definitions are created, a CCMIS System MIB and a CCMIS Partition MIB. The variables defined in the CCMIS System MIB are designed for use by the CCMIS service provider, while the CCMIS Partition MIB is designed to be used by the call center operator. The CCMIS System MIB is a private MIB extension that provides information regarding the state and health of the CCMIS 24. The CCMIS Partition MIB is a private MIB extension that provides status information for a single partition within the CCMIS 24. Although the definition of the CCMIS Partition MIB is the same for all partitions, the location of the CCMIS Partition MIB within the SNMP object hierarchy is different for each partition. Accordingly, access controls can be defined independently for each partition, thereby keeping the information in each MIB private. Therefore, the MIB 25 provides status information for the partition as well as user-defined information for each ACD group 36a being monitored by that partition. The CCMIS 24

Certain operations, variable names, and descriptions are imported from conventional SNMP operation, and are defined by the Consultative Committee on International Telegraphy and Telephony (or "CCITT") and the International Organization for Standardization (or "ISO"), and are well known by those skilled in the art. Modifications and additions to these conventional operations, variable names, and descriptions are described below.

The CCMIS 24, which contains the MIB 25, is coupled to the ACD switch 36 and monitors the status of each of the plurality of agents 34 located at the ACD switch 36. The CCMIS 24 is also coupled to the NMS 30 using the SNMP interface 28. The NMS 30 queries the CCMIS 24 for status information.

In relation to the CCMIS Partition MIB, the NMS 30 can monitor, through the CCMIS 24, the status of each ACD group 36a. When the status of any ACD group violates an alarm conditions, as discussed in detail below, an alarm is triggered. When the alarm is triggered, the SNMP agent 39 within the CCMIS 24 generates and sends a corresponding trap message 38 to the NMS 30. The possible types of trap messages are set forth in Table 6 of Appendix A. When the CCMIS 24 generates the trap message 38, a corresponding start and end signal are generated to indicate, respectively, the start of the problem condition and the end of the problem condition as the ACD group 36a returns to normal condition.

In relation to the CCMIS System MIB, if the status of the link to the ACD switch 36 changes (link up or link down), then a specific trap is generated, which may be any of those set forth in Table 1 of Appendix A. When the CCMIS 24 generates the trap message 38, a corresponding start and end signal are generated to indicate, respectively, the start of the problem condition and the end of the problem condition.

An interface 40 couples the terminal 22 to the CCMIS 24. The interface 40 provides a connection to the CCMIS 24. Thus, the supervisor can set and change alarm condition parameters using the terminal 22. The supervisor defines an alarm by establishing alarm condition parameters for monitoring the ACD group 36a. Accordingly, if the status of any ACD group 36a within the ACD switch 36 violates the alarm condition, then the CCMIS 24 detects a violation of the alarm conditions. When the alarm condition is violated, a trap signal is triggered and the CCMIS 24 sends the SNMP trap messages 38 to the NMS 30. Based on the alarm definition, the NMS 30 can determine the condition and the attention required.

Access to each of the supported MIBs is controlled separately. Setup of the SNMP access control for MIB-2 and the CCMIS System MIB is performed via the maintenance interface. Access control setup for the CCMIS Partition MIB is via the supervisor interface. Access control in the SNMP protocol is via "communities" that consist of a community name, an access mode, and the set of the IP addresses of SNMP managers within that community. Although SNMP sets no limit on the number of communities that can be defined, CCMIS will implement a set of three communities for each MIB made up of the following: a read-only community, a read-write community, and a trap community. The read-only community lists the addresses of query managers or SNMP managers which may query MIB variables, but are not allowed to set them. The read-write community lists the addresses of the SNMP managers that can query as well as set MIB variables. Finally, the trap community lists the addresses of the SNMP managers that are to receive any traps generated.

The name for each community is configurable and may consist of 1 to 15 characters. Although it is desirable for the read-only and read-write communities to have different names, if the read-only and the read-write communities are named the same, then the IP address of the requesting manager is used to determine which access should be granted to the request, with the read-write community being searched first.

If an IP address of 0.0.0.0 is entered into the IP address list of a community, then all SNMP managers will be considered to be a part of that community. The 0.0.0.0 IP address may not be used in the trap community because the CCMIS 24 needs an explicit list of SNMP managers that are to receive traps.

CCMIS System MIB

The CCMIS System MIB definition consists of the following groups: BASE, LINKS, and PTNS. The BASE group is a group of variables that provide very general information about the CCMIS 24. The variables are not related to any specific component of the CCMIS system software and are primarily for informational purposes, having read-only type of access. The variables and their descriptions are shown in Table 2 of Appendix A.

The LINKS group contains information and statistics relating to the configuration and status of a link 42, which can be any conventional link, such as an X.25 link, from the CCMIS 42 to the ACD switch 36. The links group contains a table of statistics maintained for each live link to the ACD switch 36. The variables in the LINKS group are shown in Table 3 of Appendix A.

The third group in the system MIB is the PTNS group. The PTNS group contains status information for each of the partitions configured on the CCMIS 24. The PTNS group provides partition status information for each partition defined on the CCMIS 24. The PTNS group is used to monitor the health of the portion of the CCMIS 24 that implements a distinct call center operator environment. The variables in the PTNS group are shown in Table 4 of Appendix A.

CCMIS Partition MIB

The CCMIS Partition MIB contains information that is useful to the call center operator. The CCMIS Partition MIB has ACD group variables. The ACD group variables contain information describing the current configuration of the ACD switch 36 and the status of the ACD switch 36. The ACD group variables in the CCMIS Partition MIB provides the NMS 30 with information to manage and monitor the ACD switch 36. The ACD group variables are partially customizable by the user in that the statistics provided for each of the ACD group variables can be defined via the terminal 22. The variables in the ACD group are shown in Table 5 of Appendix A.

MIB Distribution

Figure 3:
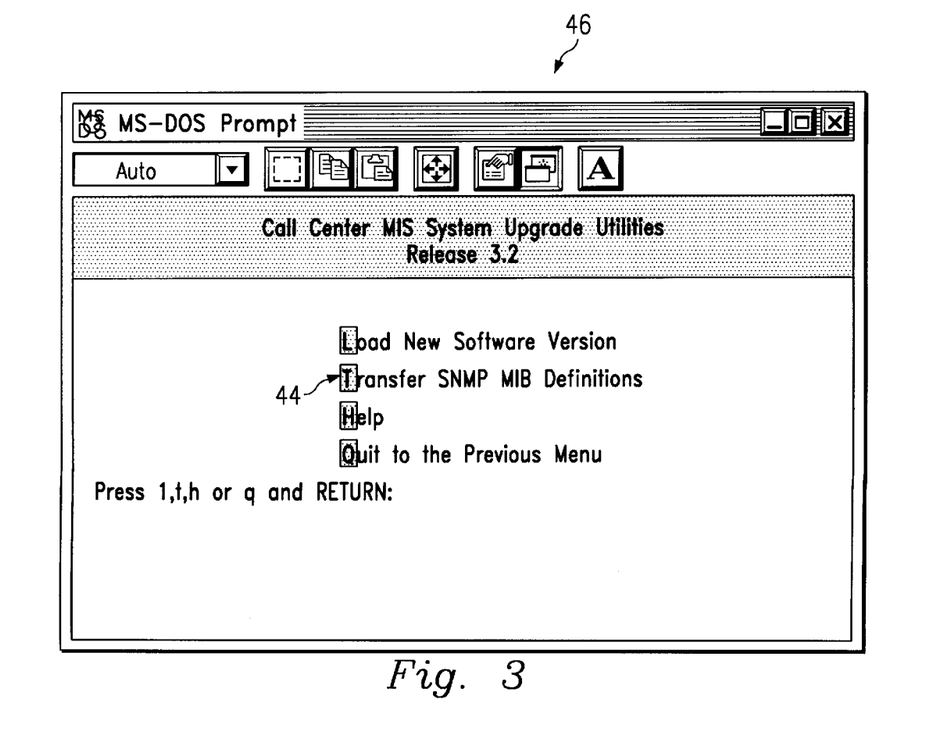
FIG. 3 illustrates a CCMIS utilities window.

FIG. 3 illustrates the menu items for distribution of custom MIB definitions. Transfer or distribution is necessary in order for the NMS 30 to be able to access and use the variables defined in the CCMIS System MIB and CCMIS Partition MIB. The MIB definition files are simple text files written according to the standard syntax defined in Request For Comments (RFC) 115. The MIB definitions files are compiled or loaded into the database of the NMS 30. Additionally, in order to accommodate the two classes of CCMIS users, i.e., service providers and call center operators, two mechanisms for the distribution of the MIB definition files are used. For service providers, a maintenance interface, such as the "maint" Unix log in, is enhanced with an additional menu item 44 in a System Upgrade Utilities menu 46. This interface facilitates the transfer of the CCMIS System MIB definition files and/or the CCMIS Partition MIB definition files to any network accessible machine which supports a File Transfer Protocol (FTP). For call center operators, the distribution of MIB definition files is accomplished via the interface 40. This distribution mechanism downloads the CCMIS System MIB definition file and/or the CCMIS Partition MIB definition files for the partition to which the supervisor interface is connected.

SNMP Interface 28

The SNMP interface 28, FIG. 1, has a CCMIS Maintenance Interface (not shown) that supports SNMP access to the CCMIS System MIB and provides a mechanism for downloading MIB definition files to the NMS 30. In order for the CCMIS Maintenance Interface to support the SNMP access, the following areas are changed: (1) Configuration Utility; (2) SNMP Configuration Report; and (3) MIB Transfer Utility. When CCMIS 24 is installed, the community names are defaulted to "public", "secure", and "traps" for the read-only, read-write, and traps communities, respectively. The members list for the read-only community is set to 0.0.0.0, while the other two member lists are empty. Each community name string may contain any string of characters, between 1 and 15 characters in length. If any community name string is completely empty, the community definitions can not be saved. The members lists will accept any syntactically valid IP addresses, including 0.0.0.0, in either of the read-only or read-write community definitions. The 0.0.0.0 IP address is not allowed in the trap community. The 0.0.0.0 IP address can be used to allow any SNMP operator access to the MIB variables provided the proper community name is used.

Privilege Level Definition

Figure 4:
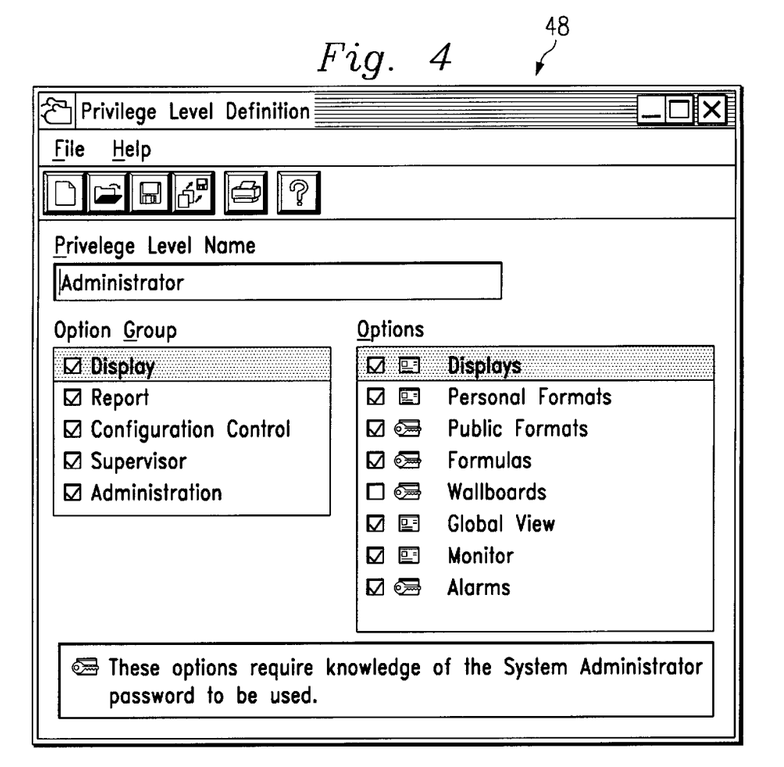
FIG. 4 illustrates a Privilege Level Definition window.

FIG. 4 illustrates a Privilege Level Definition window 48 used to control access to the alarm definition and SNMP setup screens by adding an alarms privilege option to the Displays group in each privilege level definition. The alarms/SNMP functionality is associated with the Displays menu since the alarm statistics are based on the same statistics as the real-time displays.

Alarm Definition

Each alarm definition contains variables that identify the source and type of problem using the following variable: OBJECT, SYNTAX, ACCESS, or DESCRIPTION. OBJECT defines a symbolic name and an object ID relative to a branch of the MIB 25 being described. In order for the NMS 30 to query the value of a particular object, an object-instance ID must be formed from the object ID presented in the MIB definitions. For scalar variables, the object-instance ID is the variable's object ID with a zero (0.0) concatenated. For variables that define a cell within a table, the object-instance ID for any particular cell in the table is the object ID of the variable with the values of all index variables for that row of the table tacked on to the end. These index variable values are concatenated in the order in which they appear in the MIB definition. SYNTAX is used to define the type of the object to the NMS 30. ACCESS defines the accessibility of the object. DESCRIPTION is a description of the purpose of the value.

Figure 5:
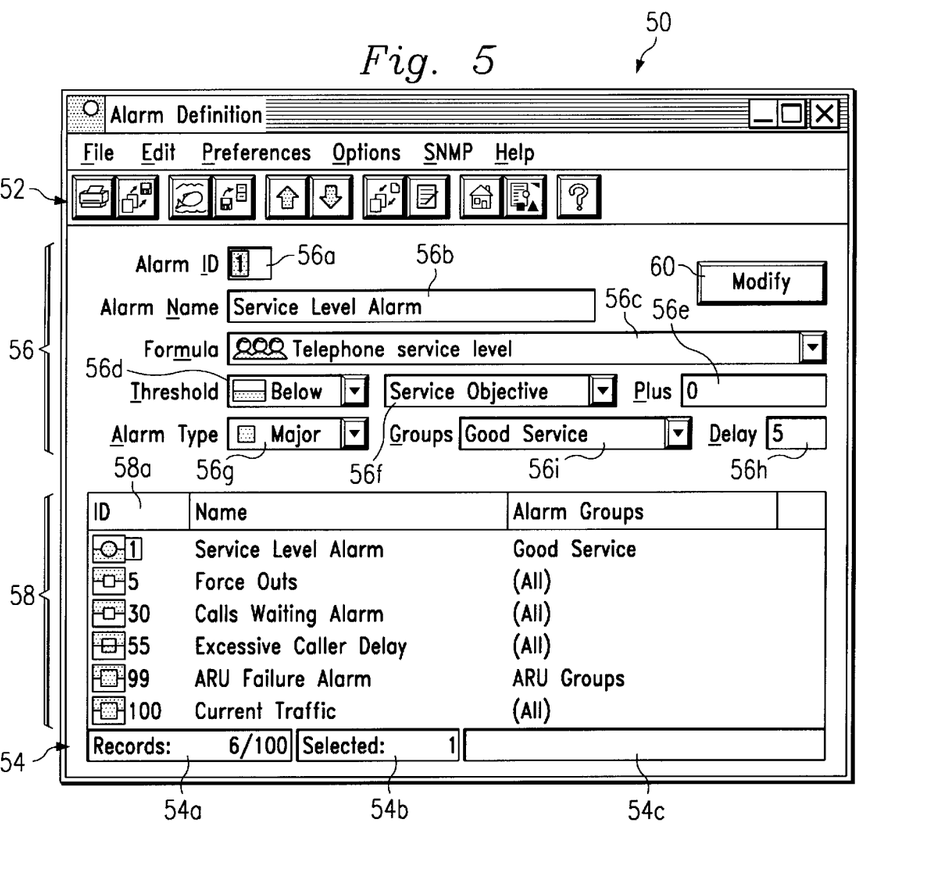
FIG. 5 illustrates an Alarm Definition window.

FIG. 5 illustrates an Alarm Definition window 50 when the user selects the Displays/Alarms command from the main menu. The Alarm Definition window 50 allows up to one hundred custom statistics to be monitored for each ACD group 36a, FIG. 1, in the partition. The setup of each statistic includes threshold and alarm information. The information defined for each Alarm Definition is supplied to the NMS 30 when the NMS 30 queries the entries in the CCMIS Partition MIB. Although the NMS 30 cannot add or delete entries, it can modify some of the fields in existing table entries. Thus, once the Alarm Definitions have been defined, they can be maintained either via the Alarm Definition window 50 or via the NMS 30. The Alarm Definition window 50 includes four major components; a tool bar 52, a status bar 54, a form template 56, and a definitions list 58.

The tool bar 52 is the row of buttons across the top of the window which provides shortcuts to many of the commands available on the window's menu. For example, a standard Windows 95 tool-tip windows, as provided by Microsoft Corp. of Redmond, Wash., can be provided for the tool bar 52.

The status bar 54 appears at the bottom of the window and consists of three sections: a first section 54a indicates the number of records defined and the maximum number allowed; a second section 54b indicates the number of records currently selected in the definitions list; and a third section 54c is for displaying status and progress messages.

The form template 56 consists of fields used to enter and modify the alarm definition. The form template 56 has an alarm ID field 56a, an alarm name field 56b, a formula field 56c, a threshold level filed 56d, a plus field 56e, a threshold type field 56f, an alarm type field 56g, an alarm delay field 56h, and an alarm groups field 56i.

The alarm ID field 56a contains a unique number in the range 1 to 100 and has an SNMP object ID. For example, the SNMP object ID could be acdAlarmDefnIndex and designated as read-only. The value of the alarm ID field 56a is used as the object instance ID used by the NMS 30 to access a particular entry in the table, such as the acdAlarmDefh Table.

The alarm name field 56b contains the name assigned to the alarm ID field 56a for a unique alarm condition. The alarm name field 56b can hold up to 30 characters excluding the vertical bar character (|). The alarm name field 56b has an SNMP object ID. For example, the SNMP object ID could be acdAlarmDefnName and designated as read-only.

The formula field 56c has either the standard or custom formula used to compute the statistic value upon which the alarm definition for the alarm condition is based. The formula field 56 does not have an SNMP object ID.

The threshold level field 56d determines whether the computed value for the statistic should cause an alarm condition to be triggered. The threshold level field 56d can have one of two values. Two possible values are BELOW or ABOVE. In this example, if the ABOVE value is selected, then the alarm condition is triggered when the statistic value begins to exceed the threshold value and ends when the statistic value falls below the threshold value. If the BELOW value is selected, then the alarm condition is triggered when the statistic value falls below the threshold value and ends when the statistic value rises back above the threshold value. The threshold level field 56d has an SNMP object ID. For example, the threshold level field 56d is accessible as the read-write SNMP object ID "acdAlarmDefnThrDir" within the acdAlarmDefn table.

The plus field 56e contains a constant component, which defines a numeric value to be added to the value of the threshold level field 56d to arrive at the threshold value used for determining when the statistic value indicates an alarm state. The plus field 56e can be any signed 32-bit number (−2,147,483,647 through 2,147,483,647). The plus field has an SNMP object ID. For example, the SNMP object ID could be acdAlarmDefnThrConst and designated as read-write.

The threshold type field 56f contains a threshold type. The threshold type in the threshold type field 56f is applied to the statistic value and can be any of the available ACD group thresholds or a special threshold type, such as zero, where the threshold value is defined solely by the constant value entered in the plus field 56e. The threshold type field 56f has an SNMP object ID. For example, the SNMP object ID could be acdAlarmDefnThrType and designated as read-write.

The alarm type field 56g determines the type of alarm or SNMP trap to be generated. The alarm type field 56g can be set to a POLL, a MINOR, a MAJOR, or a CRITICAL setting. The POLL setting designates that no trap is generated and the NMS 30 must periodically poll the CCMIS 24 to get the statistic value. If either of the MINOR, MAJOR, or CRITICAL settings are selected then a trap is generated. For example, if the MINOR, MAJOR, or CRITICAL settings are selected, then either an "acdMinorStart", an "acdMajorStart", or an "acdCriticalStart" trap, respectively, is sent when the statistic values enter into the alarm condition and an "acdMinorEnd", an "acdMajorEnd", or an "acdCriticalEnd" trap, respectively, are sent when the statistic values leave the alarm condition. The alarm type field 56g has an SNMP object ID. For example, the SNMP object ID could be acdAlarmDefnAlarmType and designated as read-write.

The alarm delay field 56h sets a delay period, in seconds, from the time that the alarm condition is first detected until the time that an SNMP trap is sent. If the alarm condition clears within the delay period, then no trap is sent. Furthermore, the delay value also applies to clearing an alarm condition, with a maximum delay value of 999 seconds. The alarm delay field 56h has an SNMP object ID. For example, the SNMP object ID could be acdAlarmDefnAlarmDelay and designated as read-write.

The alarm groups field 56i determines which ACD group should cause traps to be generated. The alarm groups field 56i contains the names of all currently defined ACD group lists and the special ALL selection. When one list is selected only the groups in the list will cause traps to be generated. If ALL is selected, then all ACD groups can cause traps to be generated. The alarm groups field 56i does not have an SNMP object ID.

The definitions list 58 is located in the bottom half of the screen and displays a scrollable list of currently defined alarm definitions. The Alarm Definition window 50 is resizable so that the number of definitions displayed in the alarm definition list 58 can be adjusted by the user. Any or all of the fields in the definition may be displayed as a column in the definitions list. The only restriction is that an ID column 58a must always appear as the first column. As columns are added or removed, the columns will automatically resize themselves to provide a best fit for the current width of the window.

The operation of the Alarm Definition window 50 depends on the current mode as indicated by a label in a mode button 60. There are two modes of operation: MODIFY and ADD. When the window is entered, the initial mode will be set to ADD if there are no alarm definitions currently defined. Otherwise, MODIFY mode selected. In MODIFY mode, entering the alarm ID of an existing alarm definition record in the alarm ID field 56a, or selecting a record in the alarm definitions list, causes the selected record to be read into the form so that it can be changed. By selecting multiple records in the definitions list, the same change can be made to one or more fields of all selected records. As a visual indication of which fields will be changed by a modify operation, the background color of each field will indicate whether or not it contains changes. The new values shown in the modified fields replace the current value of the fields for all selected records. If a record is selected in the definitions list while the mode button 60 indicates ADD, then the mode is automatically switched to MODIFY and the selected record is loaded into the template fields.

SNMP Community

Figure 6:
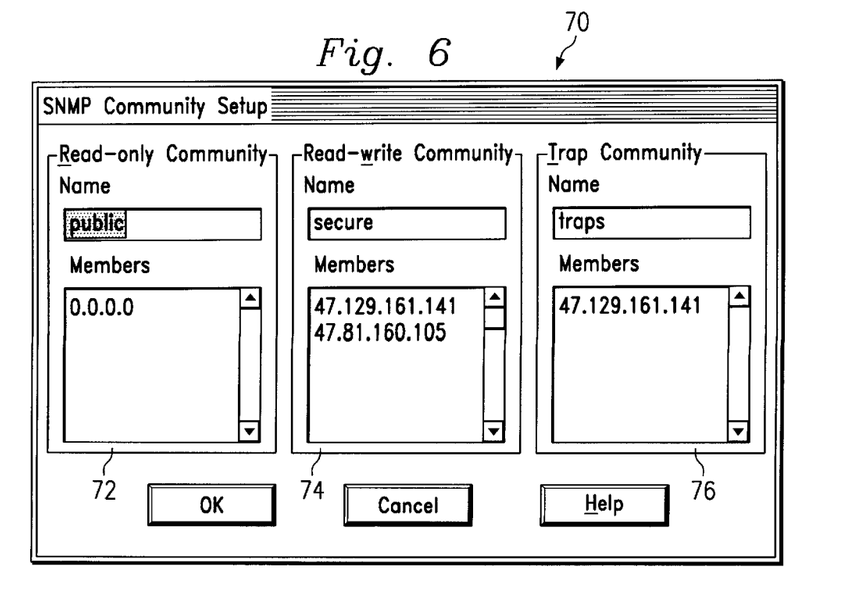
FIG. 6 illustrates an SNMP Community Setup window.

FIG. 6 illustrates an SNMP Community Setup window 70, which is accessed from the Alarm Definition window 50. The SNMP Community Setup window 70, allows the user to define the access rights for various NMSs, such as the NMS 30, wishing to access the CCMIS Partition MIB. The SNMP Community Setup window 70 displays the current settings for each of the three communities defined by the CCMIS 24. When the CCMIS partition MIB is created, the community names are defaulted to "public", "secure", and "traps" for a read-only community 72, a read-write community 74, and a trap community 76, respectively. The members list for the read-only community will be set to 0.0.0.0, while the other two members lists will be empty. Each community name string can be any string of characters, between 1 and 15 characters in length, from the set of all characters excluding the vertical bar character (|). If any community name string is completely empty, the community definitions cannot be saved. The members lists will accept any syntactically valid IP addresses, including 0.0.0.0 in either of the read-only or read-write community definitions. The 0.0.0.0 IP address will not be allowed in the trap community. The 0.0.0.0 IP address can be used allow any SNMP manager to access the MIB variables provided the proper community name is used. A limit of 100 IP addresses will be allowed in each of the members lists.

SNMP MIB Transfer

Figure 7:
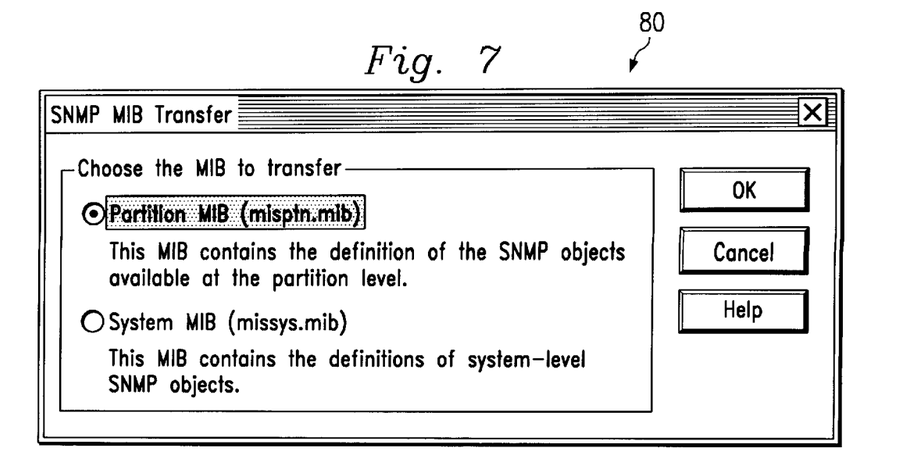
FIG. 7 illustrates an MIB Transfer window.

FIG. 7 illustrates an MIB Transfer window 80 that is accessed from the Alarm Definition window 50. The MIB transfer window 80 allows the user to download the CCMIS MIB definition files to a local PC for use with the NMS 30. The MIB definition files are text files which define all of the SNMP objects implemented by the CCMIS 24. The MIB files are written using the conventions described in RFCs 1155 and 1215 and are loaded or compiled into any SNMP-compliant NMS without modification. Note that the CCMIS Partition MIB definition file is set up to access the partition from which the MIB file was downloaded. The MIB Transfer window 80 allows the user to select either the CCMIS Partition MIB or the CCMIS System MIB to be downloaded.

In another embodiment of the present invention, limit and control access to the alarm definition and configuration of the SNMP is achieved by using a privilege flag added to a Privilege Level Definition mode.

In yet another embodiment of the present invention, the LAN connection 26 of the network 20, FIG. 1, is replaced by a wide area network (WAN) connection without deviation from the scope of the present invention.

Although illustrative embodiments of the invention have been shown and described, other modifications, changes, and substitutions are intended in the foregoing disclosure. Accordingly, it is appropriate that the appended claims be construed broadly and in a manner consistent with the scope of the invention.

What is claimed is:

1. In a call center including an agent group having a plurality of agents, a plurality of operators, and a call center management information system (CCMIS), a method for monitoring at least one unscheduled problem condition of the agent group and notifying an external destination comprising the steps of:

creating a management information base (MIB) in the CCMIS for providing information of the unscheduled problem condition;

defining a threshold for the condition to be stored in the MIB;

selecting the external destination to be notified in case the threshold is violated;

monitoring the condition of the agent group within the call center based on one or more statistic values of the agent group for any violation of the threshold; and generating a trap message in response to a violation of the threshold, wherein the trap message is sent to the external destination.

2. The method of claim 1 further comprising the steps of:

sending a trap start message to the external destination when the condition violates the threshold; and sending a trap end message to the external destination when the condition no longer violates the threshold.

3. The method of claim 2 wherein the step of monitoring is performed by the CCMIS.

4. The method of claim 1 wherein the CCMIS supports at least two groups of users.

5. The method of claim 4 wherein the step of creating comprises the steps of:

creating a system MIB; and creating a partition MIB.

6. The method of claim 4 further comprising the steps of:

establishing a first group of users to access the system MIB; and establishing a second group of users to access the partition MIB.

7. The method of claim 1 wherein the step of defining a threshold comprises the steps of:

activating an alarm definition; and establishing which of the plurality of agents will respond to the alarm definition.

8. The method of claim 1 wherein the destination is a network management system (NMS).

9. The method of claim 8 wherein the NMS can modify the threshold.

10. A method for monitoring a condition of a plurality of agent groups of an automatic call distributor (ACD) center by querying a management information base (MIB) using a network management system (NMS), the method comprising the steps of:

defining a threshold boundary condition to establish an unscheduled alarm condition of the agent groups within the call center;

comparing the unscheduled alarm condition to the threshold boundary condition to determine if the alarm condition has been violated based on one or more monitored statistic values of the agent groups; and sending an alarm message to the network management system if the condition is not within the defined threshold boundary.

11. The method of claim 10 wherein the step of defining a threshold comprises the steps of:

selecting an alarm identification;

establishing an alarm formula;

setting a threshold level;

setting a threshold type;

choosing a numeric value to be added to the threshold type;

assigning a priority to the alarm condition;

determining if the agent group should generate a trap; and waiting a predetermined period of time before generating the trap.

12. The method of claim 10 wherein the step of comparing the alarm condition comprises the steps of:

generating a start trap when the alarm condition violated the alarm condition; and generating an end trap when the alarm condition no longer violates the alarm condition.

13. A network for monitoring problem conditions of an automatic call distributor (ACD) center comprising:

a management information base (MIB) for defining a plurality of variables;

a plurality of ACD groups each having a plurality of agents and coupled to the MIB for implementing designated ones of the plurality of variables based on the plurality of variables as defined in the MIB; and a user interface coupled to the plurality of ACD groups for defining unscheduled alarm conditions of the ACD groups within the call center based on one or more statistic values to be monitored.

14. The network of claim 13 wherein the MIB comprises:

means for storing information about each of the plurality of agents;

means for altering and storing alarm definitions via the user interface; and means for storing the alarm conditions established for each of the plurality of ACD groups.

15. The network of claim 14 wherein the designated agent generates a trap when a corresponding alarm condition is violated.

16. In a call center including a plurality of automatic call distributor (ACD) groups, each having a plurality of agents and a call center management information system (CCMIS) which supports at least two groups of users, a method for monitoring at least one unscheduled problem condition of the ACD groups and notifying an external destination comprising the steps of:

creating a management information base (MIB) having information regarding each of the plurality of agents, information regarding the at least one unscheduled problem condition of the ACD groups, the creating step further comprising the steps of creating a system MIB and creating a partition MIB;

establishing a first group of users to access the system MIB and a second group of users to access the partition MIB;

defining a threshold for a first one of the at least one unscheduled problem condition to be stored in the MIB;

selecting the external destination to be notified in case the threshold is violated;

monitoring the first one of the at least one unscheduled problem condition for any violation of its threshold; and in response to a violation of the threshold of the first one of the at least one unscheduled problem condition, generating a trap message to be sent to the external destination.

17. The method of claim 16 wherein the step of generating a trap message to be sent to the external destination further comprises the steps of:

sending a trap start message to the external destination in response to the violation of the threshold of the first one of the at least one condition; and sending a trap end message to the external destination in response to an end of the violation of the threshold of the first one of the at least one condition.

18. The method of claim 17 wherein the monitoring step is performed by the CCMIS.

19. The method of claim 16 wherein the step of defining a threshold comprises the steps of:

activating an alarm definition; and establishing which of the plurality of agents will respond to the alarm definition.

20. The method of claim 16 wherein the destination is a network management system (NMS).

21. The method of claim 20 wherein the NMS can modify the threshold.

22. The method of claim 16 wherein the step of defining a threshold comprises the steps of:

selecting an alarm identification;

establishing an alarm formula;

setting a threshold level;

setting a threshold type;

choosing a numeric value to be added to the threshold type;

assigning a priority to the alarm condition;

determining if the agent group should generate a trap; and waiting a predetermined period of time before generating the trap.

* * * * *